(12) United States Patent
Hwang et al.

(10) Patent No.: US 7,502,310 B2
(45) Date of Patent: Mar. 10, 2009

(54) APPARATUS AND METHOD FOR ASSIGNING SUBCHANNEL IN A MOBILE COMMUNICATION SYSTEM USING ORTHOGONAL FREQUENCY DIVISION MULTIPLE ACCESS SCHEME

(75) Inventors: In-Seok Hwang, Seoul (KR); Soon-Young Yoon, Seongnam-si (KR); Sang-Hoon Sung, Suwon-si (KR); Jae-Hee Cho, Seoul (KR); Hoon Huh, Seongnam-si (KR); Kwan-Hee Roh, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 832 days.

(21) Appl. No.: 10/901,738

(22) Filed: Jul. 29, 2004

(65) Prior Publication Data

US 2005/0025039 A1  Feb. 3, 2005

(30) Foreign Application Priority Data

Jul. 30, 2003 (KR) .............................. P2003-52893

(51) Int. Cl.
*H04J 11/00* (2006.01)
(52) U.S. Cl. ..................................... 370/208
(58) Field of Classification Search ........................ None
See application file for complete search history.

(56) References Cited

U.S. PATENT DOCUMENTS

| 5,442,660 A | * | 8/1995 | Kuo et al. ................... 375/134 |
| 6,904,283 B2 | * | 6/2005 | Li et al. ...................... 455/450 |
| 7,039,001 B2 | * | 5/2006 | Krishnan et al. ............. 370/203 |
| 7,391,750 B2 | * | 6/2008 | Kim et al. ................... 370/329 |
| 2003/0086366 A1 | * | 5/2003 | Branlund et al. ............ 370/208 |
| 2004/0062193 A1 | * | 4/2004 | Ma et al. .................... 370/208 |
| 2004/0190640 A1 | * | 9/2004 | Dubuc et al. ................ 375/260 |
| 2005/0013279 A1 | * | 1/2005 | Hwang et al. ............... 370/343 |

\* cited by examiner

*Primary Examiner*—Edan Orgad
*Assistant Examiner*—Timothy J Weidner
(74) *Attorney, Agent, or Firm*—The Farrell Law Firm, PC

(57) ABSTRACT

A two-dimensional subchannel assigning method and apparatus in a time-frequency domain where a plurality of subcarriers are arranged along a time domain with a plurality of symbols and along a frequency domain with a plurality of subbands in an OFDM communication system. In the subchannel assigning method, the plurality of subcarriers are divided into a plurality of frequency bands and the frequency bands are grouped into the subbands. A plurality of groups are generated by dividing each of the subbands in the frequency domain by the number of the symbols in the time domain. Subcarriers selected from the respective groups in each of the subbands are assigned as an AMC subchannel to which an AMC scheme is applied.

8 Claims, 6 Drawing Sheets

| Subcarrier Index | Symbol 0 n=0 | Symbol 1 n=1 | Symbol 2 n=2 | Symbol 3 n=3 | Symbol 4 n=4 | Symbol 5 n=5 |
|---|---|---|---|---|---|---|
| 0–96 | GROUP 0 | GROUP 16 | GROUP 32 | GROUP 48 | GROUP 64 | GROUP 80 |
| 97–193 | GROUP 1 | GROUP 17 | GROUP 33 | GROUP 49 | GROUP 65 | GROUP 81 |
| . | . | . | . | . | . | . |
| . | . | . | . | . | . | . |
| . | . | . | . | . | . | . |
| . | . | . | . | . | . | . |
| . | . | . | . | . | . | . |
| . | . | . | . | . | . | . |
| . | . | . | . | . | . | . |
| . | . | . | . | . | . | . |
| . | . | . | . | . | . | . |
| . | . | . | . | . | . | . |
| . | . | . | . | . | . | . |
| 1348–1454 | GROUP 14 | GROUP 30 | GROUP 46 | GROUP 62 | GROUP 78 | GROUP 94 |
| 1455–1551 | GROUP 15 | GROUP 31 | GROUP 47 | GROUP 63 | GROUP 79 | GROUP 95 |

FIG.4

APPARATUS AND METHOD FOR ASSIGNING SUBCHANNEL IN A MOBILE COMMUNICATION SYSTEM USING ORTHOGONAL FREQUENCY DIVISION MULTIPLE ACCESS SCHEME

PRIORITY

This application claims priority under 35 U.S.C. § 119 to an application entitled "Apparatus and Method for Assigning Subchannel in a Mobile Communication System Using Orthogonal Frequency Division Multiple Access Scheme" filed in the Korean Intellectual Property Office on Jul. 30, 2003 and assigned Serial No. 2003-52893, the contents of which are incorporated herein by reference.

BACKGROUND OF THE INVENTION

1. Field of the Invention

The present invention relates generally to a mobile communication system using an orthogonal frequency division multiple access (OFDMA) scheme (hereinafter, referred to as an OFDMA mobile communication system), and in particular, to an apparatus and a method for adaptively assigning subchannels based on feedback channel quality information (CQI) of each subchannel.

2. Description of the Related Art

With the introduction of the cellular mobile communication system in the U.S. in the late 1970's, Korea began to provide a voice communication service in a first generation (1G) analog mobile communication system, AMPS (Advanced Mobile Phone Service). In the mid 1990's, Korea deployed a second generation (2G) mobile communication system, a CDMA (Code Division Multiple Access) system, to provide voice and low-speed data services.

In the late 1990's, Korea partially deployed a third generation (3G) mobile communication system, the IMT-2000 (International Mobile Telecommunication-2000 system), aiming at an advanced wireless multimedia service, worldwide roaming, and a high-speed data service. The 3G mobile communication system was especially developed to transmit data at a high data ate and in compliance with the rapid increase in volume of the serviced data.

The 3G mobile communication system is evolving to a fourth generation (4G) mobile communication system. The 4G mobile communication system is currently under the standardization process for the purpose of providing an efficient interworking and an integrated service between a wired communication network and a wireless communication network beyond the simple wireless communication service which the previous-generation mobile communication systems provide. It follows that a technology for transmitting a large volume of data at up to a capacity level available in the wired communication network must be developed for the wireless communication network.

In this context, studies are being actively conducted to utilize the orthogonal frequency division multiplexing (OFDM) scheme as a useful scheme for high-speed data transmission on wired/wireless channels in the 4G mobile communication system. OFDM is a special case of multi-carrier modulation (MCM) in which a serial symbol sequence is converted to parallel symbol sequences and modulated to a plurality of mutually orthogonal sub-carriers (or sub-carrier channels).

The first MCM systems appeared in the late 1950's for military high frequency (HF) radio communication, and OFDM with overlapping orthogonal sub-carriers was initially developed in the 1970's. In view of the orthogonal modulation between the multiple carriers, the OFDM has limitations in actual implementation for systems. In 1971, Weinstein, et. al. proposed an OFDM scheme that applies a DFT (Discrete Fourier Transform) to the parallel data transmission as an efficient modulation/demodulation process, which was a driving force behind the development of the OFDM. Also, the introduction of a guard interval and a cyclic prefix as the guard interval further mitigates adverse effects of the multi-path propagation and the delay spread on the systems. That is why OFDM has been widely exploited for digital data communications such as digital audio broadcasting (DAB), digital TV broadcasting, wireless local area network (WLAN), and wireless asynchronous transfer mode (WATM).

Although the complexity of hardware was an obstacle to the wide use of the OFDM, recent advances in digital signal processing technology including FFT (Fast Fourier Transform) and IFFT (Inverse Fast Fourier Transform) enable the OFDM to be implemented. OFDM, similar to FDM (Frequency Division Multiplexing), boasts of an optimum transmission efficiency in a high-speed data transmission because it transmits the data on sub-carriers, maintaining an orthogonality among them. The optimum transmission efficiency is further attributed to a good frequency use efficiency and a robustness against the multi-path fading in the OFDM.

Overlapping frequency spectrums lead to an efficient frequency use and a robustness against frequency selective fading and multi-path fading. The OFDM reduces the effects of the ISI (Inter Symbol Interference) by use of guard intervals and enables the design of a simple equalizer hardware structure. Furthermore, since the OFDM is robust against impulse noise, it is increasingly popular in communication systems.

In an OFDM-based multiple access scheme (OFDMA), a plurality of users share the subcarriers of one OFDM symbol. OFDMA communication systems include these defined in IEEE (Institute of Electrical and Electronics Engineers) 802.16a and IEEE 802.16e. The IEEE 802.16a communication system is a broadband wireless access (BWA) communication system based on OFDMA.

The IEEE 802.16e communication system is an expansion of the IEEE 802.16a communication system, which supports the mobility of the mobile station or user equipment. Both the IEEE 802.16a and IEEE 802.16e communication systems use a 2048-point IFFT and 1702 subcarriers. From among the 1702 subcarriers, 166 of the subcarriers are pilot subcarriers and the remaining 1536 subcarriers are data subcarriers. The 1536 data subcarriers are divided into 32 subchannels, each subchannel having 48 subcarriers, and the subchannels are assigned to a plurality of users according to system situations.

"Subchannel" refers to a channel comprising a plurality of subcarriers. 48 subcarriers form one subchannel in the IEEE 802.16a and IEEE 802.16e communication systems. The OFDMA mobile communication systems aim to achieve a frequency diversity gain by distributing all of the available subcarriers, particularly the data subcarriers, over the whole frequency band.

A scheme for dynamically changing subcarriers assigned to a particular user is referred to as frequency hopping (FH). A combination of the FH and the OFDMA is referred to herein as FH-OFDM. A communication system using the FH-OFDM scheme (hereinafter, referred to as an FH-OFDM communication system) hops the frequency band of the sub-carriers assigned to the users by the FH. The FH-OFDM communication system also seeks to achieve a frequency diversity gain by distributing all of the available subcarriers, particularly the data subcarriers, over the whole frequency band.

As described above, the IEEE 802.16a and IEEE 802.16e communication systems divide a wide band of, for example 10 MHz, into subchannels in the frequency domain only. They use the 1702 subcarriers per OFDM symbol and the 2048-point IFFT. Therefore, if the subchannels are assigned using a Reed-Solomon (RS) sequence having a relatively good collision characteristic between the subchannels under a multicell environment, about 40 cells can be identified since 41×40=1640.

However, to facilitate a network designing along with the development of the mobile communication systems, up to at least 100 cells need to be identified. In terms of the number of identifiable cells, the OFDMA has limitations because it forms the subchannels only in the frequency domain.

A Flash-OFDM scheme using a narrow band of 1.25 MHz defines 113 hopping sequences as a basic resource assignment unit. The 113 hopping sequences hop different subcarriers for one period of 113 OFDM symbols using a 128-point IFFT. A communication system using the Flash-OFDM scheme (hereinafter, a Flash-OFDM communication system) can identify 113 different cells by defining the different hopping sequences for the respective 113 cells in network designing. The Flash-OFDM scheme is, however, viable for only a narrow band, which implies that it cannot contribute to a capacity increase needed for the current 4G communication system.

In a typical cellular communication system, a signal transmitted from a transmitter travels to a receiver from multiple paths. Thus, the received signal experiences frequency-selective fading. With reference to FIG. 1, the frequency response characteristics in relation to frequency-selective fading in an OFDMA mobile communication system will be described below.

FIG. 1 illustrates transmit frequency response characteristics and receive frequency response characteristics in an OFDMA mobile communication system.

Referring to FIG. 1, the frequency spectrum 111 of an OFDMA signal transmitted from a transmitter, for example in a base station (BS), has the same frequency responses for the respective subcarrier signals in the entire frequency band. Since each subcarrier signal in the frequency band has the same frequency response in the OFDMA mobile communication system, the global frequency band exhibits the same frequency response characteristic. It is assumed that the subcarrier signals having the same frequency response are transmitted to different users (i.e. mobile subscriber stations: MSSs), for example a first MSS and a second MSS. While obviously the subcarriers are transmitted to more MSSs in the OFDMA mobile communication system, it is assumed that the entire subcarrier signals are equally transmitted to the two MSSs, in order to compare their frequency response characteristics.

The first MSS receives the entire subcarrier signals from the BS, with a different frequency spectrum 121 from the frequency responses of the transmitted subcarrier signals. Some subcarriers have frequency responses at or above a demodulation threshold and others have frequency responses below the demodulation threshold.

As illustrated in FIG. 1, four subcarrier signals have frequency responses below the threshold from among the total received signals at the first MSS. When the BS transmits data to the first MSS on the four subcarriers, the first MSS cannot normally receive the data because of the frequency-selective fading.

The second MSS also receives the entire subcarrier signals from the BS, with a different frequency spectrum 131 from the frequency responses of the transmitted subcarrier signals. Some subcarriers have frequency responses at or above the threshold and others have frequency responses below the threshold. As illustrated in FIG. 1, five subcarrier signals have frequency responses below the threshold from among the total received signals at the second MSS. When the BS transmits data to the first MSS on the five subcarriers, the second MSS cannot normally receive the data because of the frequency-selective fading.

Consequently, some of the total subcarriers are feasible for a particular MSS, and others are not in the OFDMA mobile communication system.

In this context, a frequency-selective adaptive modulation and coding (AMC) scheme was proposed to compensate for the performance degradation caused by the frequency-selective fading. The frequency-selective AMC scheme adaptively determines a modulation and a coding method for each subcarrier according to the frequency response of the subcarrier. The modulation scheme adjusts the transmit power and the coding scheme adjusts a coding rate. The frequency response can be defined as a carrier-to-interference and noise ratio (CINR). Then, the modulation and coding method is adaptively determined for each subcarrier according to the CINR of the subcarrier.

The frequency-selective AMC scheme involves a plurality of modulation schemes and a plurality of coding schemes. It selects a combination of a modulation scheme and a coding scheme, for modulation and coding. Modulation and coding combinations are called modulation and coding schemes (MCSs). Level 1 to level n MCSs can be defined depending on the number of available MCSs. Thus, the frequency-selective AMC scheme adaptively selects an MCS level according to the frequency response characteristics of a BS and a MSSs, to thereby increase the transmission capacity of the BS and improve the total system efficiency of the OFDMA mobile communication system.

The use of the AMC scheme in the OFDMA mobile communication system requires a knowledge of the frequency response of each subcarrier. That is, the BS can apply the AMC scheme only when the MSSs feed back the CINRs of all of the subcarriers to the BS. With reference to FIGS. 2A and 2B, the feedback of the frequency response (i.e. CQI (Channel Quality Indicator)) of each subcarrier will be described below.

FIG. 2A illustrates the transmission positions of pilot signals in the frequency domain in the typical OFDMA mobile communication system.

Referring to FIG. 2A, the transmitter (i.e. the BS) transmits a pilot signal only on pilot subcarriers whose positions are preset in the OFDMA mobile communication system. The receiver (i.e. the MSS) already has knowledge of the positions of the pilot subcarriers and knowledge of the pilot signal on the pilot subcarriers. The pilot signal is a preset sequence between the BS and the MSSs. The MSS detects the CINR of each pilot subcarrier by dividing a signal received on the pilot subcarrier by the pilot signal of the pilot subcarrier. Then it interpolates the CINRs of the pilot subcarriers, thereby estimating the CINRs of the data subcarriers. The MSS feeds back the CINRs (i.e. CQIs) of the subcarriers to the BS and the BS selects an MCS for the corresponding subcarriers based on the CQIs.

FIG. 2B illustrates the transmission positions of the pilot symbols in the time domain in the typical OFDMA mobile communication system.

Referring to FIG. 2B, the BS transmits a pilot symbol during a predetermined symbol period. Although each BS uses the same subcarriers, the BS generates a pilot symbol by multiplying a block, having as many subcarriers as a predetermined spreading factor, by an orthogonal code of the same length, and multiplying the resulting product by a different PN (Pseudo Noise) code from those of other BSs. The MSS identifies the signal from the BS by the PN code, calculates the CINR of each subcarrier using the orthogonal code, and feeds back the CQI of the subcarrier to the BS.

The above-described CQI feedback method is suitable only under the assumption that the channel states of the subcarriers assigned to the MSS is unaltered in the OFDMA mobile communication system. However, the current 4G mobile communication system considers the adoption of the OFDMA for high-speed mobile communications. Therefore, the above assumption is not valid. That is, once the subcarriers are assigned to an MSS, their channel states vary. Thus, the MSS must feed back the changing CQI of each of the subcarrier to the BS so that the BS can accurately use the AMC scheme.

Yet, the frequent CQI feedback for each subcarrier brings about a signaling overhead and the CQI feedback signaling acts as an uplink interference.

Therefore, there is a need for a method for efficiently using the AMC scheme, supporting the high-speed mobile communication service in the OFDMA mobile communication system.

SUMMARY OF THE INVENTION

An object of the present invention is to substantially solve at least the above problems and/or disadvantages and to provide at least the advantages below. Accordingly, an object of the present invention is to provide a subchannel assigning apparatus and method using an AMC scheme in an OFDMA mobile communication system.

Another object of the present invention is to provide an apparatus and method for two-dimensionally assigning subchannels in a time-frequency domain, using an AMC scheme in an OFDMA mobile communication system.

A further object of the present invention is to provide a subcarrier assigning apparatus and method using an AMC scheme, which minimize the collision between adjacent subchannels in an OFDMA mobile communication system.

The above objects are achieved by providing a two-dimensional subchannel assigning method and apparatus.

According to one aspect of the present invention, in a two-dimensional subchannel assigning method in a time-frequency domain having a plurality of subcarriers arranged along a time domain with a plurality of symbols and arranged along a frequency domain with a plurality of subbands in an OFDM communication system, the plurality of subcarriers are divided into a plurality of frequency bands and the frequency bands are grouped into the subbands. A plurality of groups are generated by dividing each of the subbands in the frequency domain by the number of the symbols in the time domain. Subcarriers selected from the respective groups in each of the subbands are assigned as an AMC subchannel to which an AMC scheme is applied.

According to another aspect of the present invention, in a subchannel assigning method in an OFDM communication system having a total frequency band divided into a plurality of subcarriers, as many groups as the number of BSs of the OFDM communication system are generated by grouping the subcarriers in a time domain. A plurality of subbands are generated by grouping the groups. Subcarriers are detected from each of the groups included in a subband according to a first sequence. The detected subcarriers are assigned as an adaptive modulation and coding (AMC) subchannel to which an AMC scheme is applied.

According to a further aspect of the present invention, in a subchannel assigning method in an OFDM communication system having a total frequency band divided into a plurality of subcarriers, (Q−1) groups are generated for n symbol periods by grouping subcarriers for each of the n symbol periods into (Q−1)/n groups, B subbands are generated by grouping the (Q−1) groups into L groups, subcarriers are detected from each of (Q−1)/L groups included in a subband according to a first sequence, and the detected subcarriers are assigned as an AMC subchannel to which an AMC scheme is applied.

According to still another aspect of the present invention, in a subchannel assigning method in an OFDM communication system where a total frequency band is divided into a predetermined number of subbands, a subchannel is formed a number of subcarriers selected from each of the subbands, a reference signal is transmitted in the subcarriers of the subchannel, and a data signal is transmitted in subcarriers other than the subcarriers of the reference signal in the subchannel, upon input of the data signal, the data signal is modulated and encoded in a predetermined modulation and coding scheme, the reference signal is inserted into the modulated and coded data signal, the reference signal-inserted signal is IFFT-processed, and the IFFT signal is transmitted to an MSS. The CQI of the data signal and the reference signal is received on a subband basis from the MSS, a subband having the best quality is selected by analyzing the received CQI and a subchannel is selected from the selected subband for the MSS.

According to yet another aspect of the present invention, in a two-dimensional subchannel assigning apparatus in a time-frequency domain where a plurality of subcarriers are arranged along a time domain with a plurality of symbols and arranged along a frequency domain with a plurality of subbands in an OFDM communication system, a subchannel/subband allocator divides a plurality of subcarriers into a plurality of frequency bands, groups the frequency bands into subbands, generates a plurality of groups by dividing each of the subbands in the frequency domain by the number of the symbols in the time domain, and assigns subcarriers selected from the respective groups in each of the subbands as an AMC subchannel to which an AMC scheme is applied. A transmitter, upon generation of data to be transmitted, transmits the data on the assigned AMC subchannel.

According to yet further aspect of the present invention, in a subchannel assigning apparatus in an OFDM communication system where a total frequency band is divided into a plurality of subcarriers, a subchannel/subband allocator generates as many groups as a number of BSs of the OFDM communication system by grouping the subcarriers in a predetermined time domain, generates a plurality of subbands by grouping groups, detects subcarriers from each of the groups included in a subband according to a first sequence, and assigns the detected subcarriers as an AMC subchannel to which an AMC scheme is applied. A transmitter, upon generation of data to be transmitted, transmits the data on the assigned AMC subchannel.

According to yet still another object of the present invention, in a subchannel assigning apparatus in an OFDM communication system where a total frequency band is divided into a predetermined number of subbands, a subchannel is formed from a number of subcarriers selected from each of the subbands, a reference signal is transmitted in subcarriers of the subchannel, and a data signal is transmitted in subcarriers other than the subcarriers of the reference signal in the subchannel, an encoder encodes the data signal in a coding method upon input of the data signal, a modulator modulates the coded data signal in a modulation method, a transmitter inserts a reference signal into the modulated data signal, IFFT-processes the reference signal-inserted signal, and transmitting the IFFT signal to an MSS, and a subchannel/subband allocator receives from the MSS the CQI of the data signal and the reference signal on a subband basis, selects a subband having the best quality by analyzing the received CQI, and selects a subchannel in the selected subband for the MSS.

BRIEF DESCRIPTION OF THE DRAWINGS

The above and other objects, features and advantages of the present invention will become more apparent from the following detailed description when taken in conjunction with the accompanying drawings in which:

FIG. 4 illustrates a two-dimensional subchannel assignment in the frequency and time domains according to an embodiment of the present invention;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention provides a method of assigning subchannels to which a frequency-selective AMC scheme is two-dimensionally applied (hereinafter, referred to as AMC subchannels) in both the frequency and the time domains in an OFDMA mobile communication system.

Thus, the present invention allows for the assignment of AMC subchannels in compliance with the CQIs received from an MSS, while increasing the number of identifiable cells and minimizing the subchannel collision between neighboring BSs. A BS may control one or more cells in servicing the MSS. For notational simplicity, the former case will be taken in describing the present invention.

Figure 1:
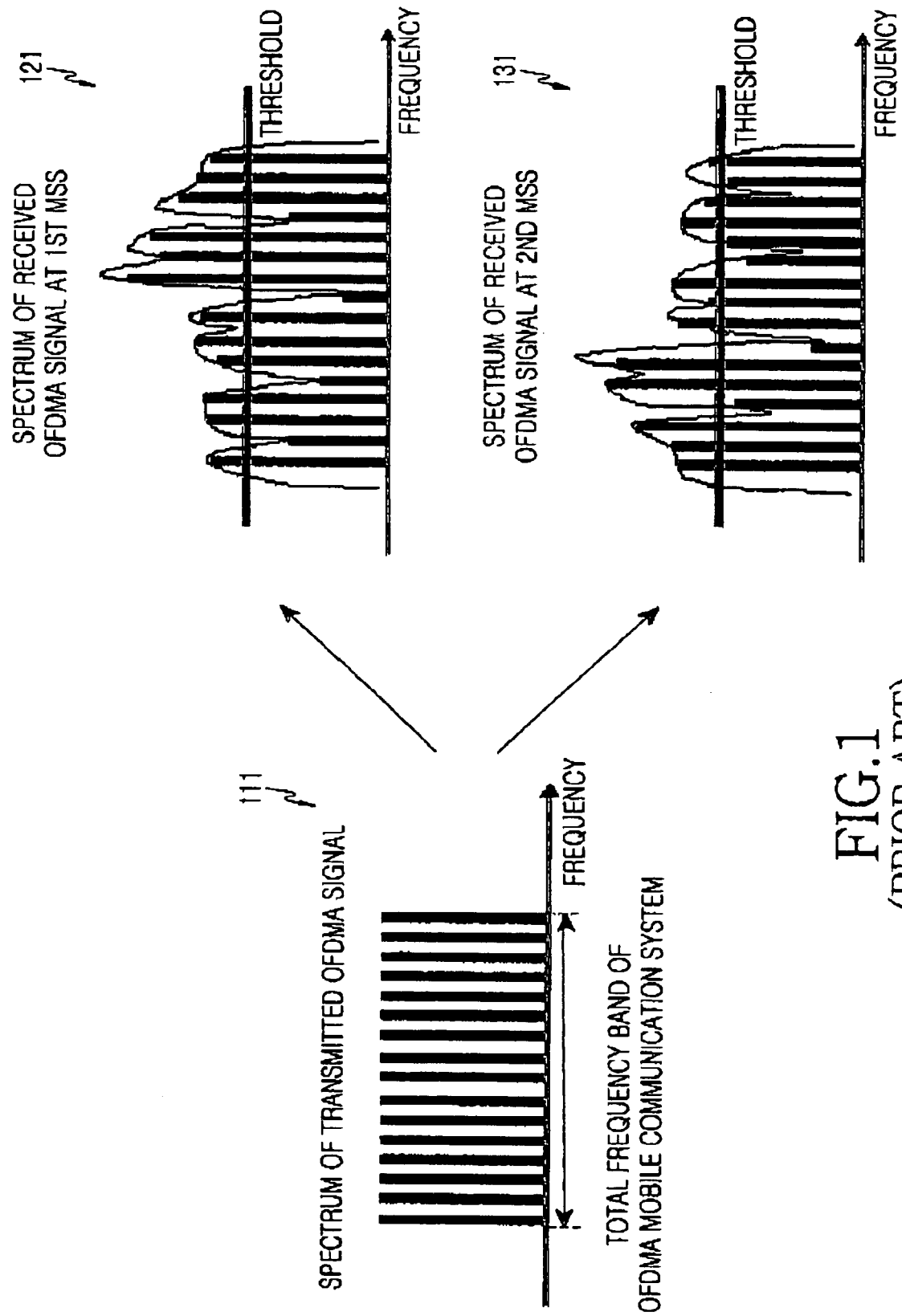
FIG. 1 illustrates transmit frequency response characteristics and receive frequency response characteristics in a typical OFDMA mobile communication system.
Figure 2A:
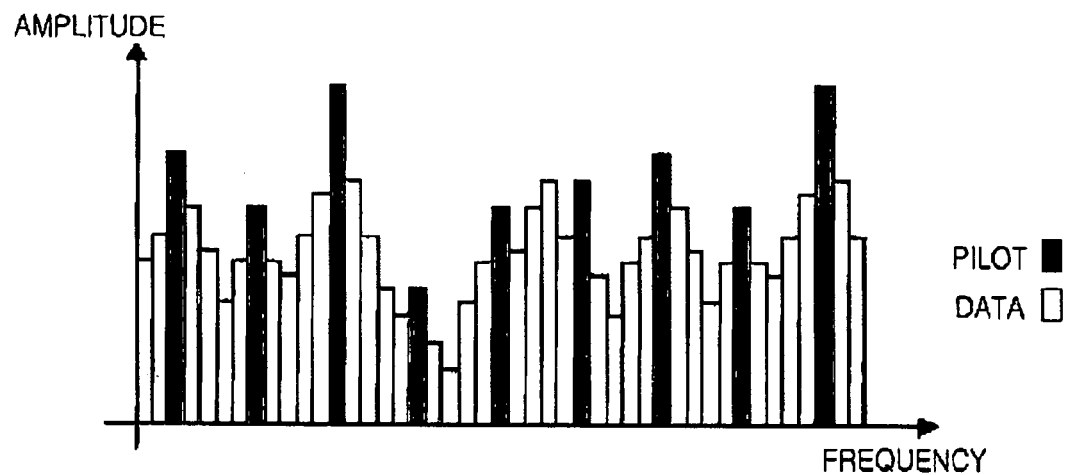
FIG. 2A illustrates the transmission positions of pilot signals in the frequency domain in the typical OFDMA mobile communication system.
Figure 2B:
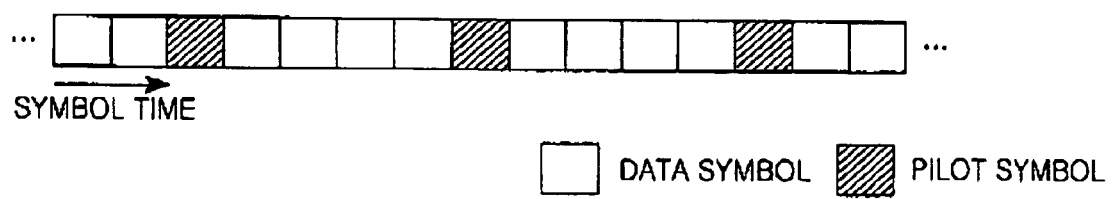
FIG. 2B illustrates the transmission positions of pilot symbols in the time domain in the typical OFDMA mobile communication system.
Figure 3:
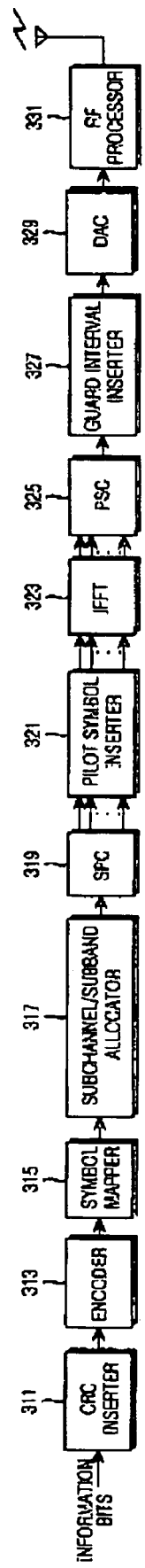
FIG. 3 is a block diagram of a transmitter in an OFDMA mobile communication system to which the present invention is applied.

With reference to FIG. 3, a transmitter in an OFDMA mobile communication system according to an embodiment of the present invention will be described.

FIG. 3 is a block diagram of a transmitter in an OFDMA mobile communication system to which the present invention is applied.

Referring to FIG. 3, the transmitter comprises a cyclic redundancy check (CRC) inserter 311, an encoder 313, a symbol mapper 315, a subchannel/subband allocator 317, a serial-to-parallel converter (SPC) 319, a pilot symbol inserter 321, an IFFT 323, a parallel-to-serial converter (PSC) 325, a guard interval inserter 327, a digital-to-analog converter (DAC) 329, and a radio frequency (RF) processor 331.

Upon the generation of the user data bits and the control data bits to be transmitted, the data and control bits are provided to the CRC inserter 311. The user data bits and control data bits are collectively called "information data bits". The CRC inserter 311 adds CRC bits to the information data bits and the encoder 313 encodes the output of the CRC inserter 311 in a predetermined coding method. The coding method can be, but is not limited to, turbo coding or convolutional coding with a predetermined coding rate.

The symbol mapper 315 modulates the coded bits received from the encoder 313 in a predetermined modulation scheme. The modulation scheme can be, but is not limited to, QPSK (Quadrature Phase Shift Keying) or 16QAM (16ary Quadrature Amplitude Modulation). The subchannel/subband allocator 317 assigns a subchannel and a band to the modulated symbols. The subchannel and band assignment is carried out according to a subchannel and band assignment method of the present invention, which will be described later.

The SPC 319 converts the serial modulated symbol sequence received from the subchannel/subband allocator 317 to parallel symbol sequences. The pilot symbol inserter 321 inserts pilot symbols into the parallel modulated symbols.

The IFFT 323 N-point IFFT-processes the signal received from the pilot symbol inserter 321. The PSC 325 serializes the IFFT signal. The guard interval inserter 327 inserts a guard interval into the serial signal from the PSC 325.

The guard interval is inserted in order to cancel the effect of the interference between an OFDM symbol transmitted for the previous OFDM symbol period and an OFDM symbol to be transmitted for the current OFDM symbol period. The guard interval is inserted in the form of a cyclic prefix or a cyclic postfix. The cyclic prefix is a copy of predetermined last samples of a time-domain OFDM symbol, inserted into an effective OFDM symbol. The cyclic postfix is a copy of predetermined first samples of a time-domain OFDM symbol, inserted into an effective OFDM symbol.

The DAC 329 converts the output of the guard interval inserter 327 to an analog signal and outputs the converted signal to the RF processor 331. The RF processor 331, includes a filter and front end units, RF-processes the analog signal to be transmit over the air, and transmits the RF signal over the air through a transmit antenna.

The subchannel and band assignment of the present invention will be detailed below.

(1) Two-Dimensional Subchannel Assignment in Time-Frequency Domain

The indexes of the subcarriers in a subchannel are represented by an RS sequence. The subchannel is formed to include the subcarriers corresponding to the indexes. All of the subcarriers available in the OFDMA mobile communication system are grouped into Q−1 groups, each having Q successive subcarriers.

Meanwhile, the RS sequence is calculated in a Galois Field (Q) with Q elements $\{0, 1, 2, \ldots, Q-1\}$. Q represents the size of the Galois Field. If Q is a prime number, addition and multiplication over the Galois Field (Q) are defined as in Equation (1)

$$a+b=(a+b) \bmod Q, \; a, b \in 0, 1, 2, \ldots, Q-1$$

$$a \times b=(a \times b) \bmod Q, \; a, b \in 0, 1, 2, \ldots, Q-1 \quad (1)$$

A sequence S defined over the Galois Field (Q) is a subchannel sequence representing the positions of subcarriers selected from the respective Q–1 groups to form a subchannel. The indexes of the subcarriers of the subchannel are expressed as in Equation (2)

$$\text{Sub\_carrier index}(i)=Q \times i+S(i) \quad (2)$$

where i is a group index indicating one of the Q–1 groups. The group index i is one of 0 to Q–1. In Equation (2), S(i) is an $(i+1)^{th}$ element in the sequence S, indicating the position of a subcarrier in a corresponding group.

Once the sequence indicating the indexes of the subcarriers forming the subchannel is determined by Equation (2), the subchannel corresponding to the sequence can be constructed. For example, given 42 available subcarriers with indexes {0, 1, 2, ..., 41}, the 42 subcarriers are grouped into 6 groups. Using a sequence of length 6, 6 subcarriers can be assigned to form a subchannel. If the subchannel sequence S is {3, 2, 6, 4, 5, 1}, the subchannel includes subcarriers {3, 9, 20, 25, 33, 36}.

A BS and a subchannel for the BS are identified using the permutation of a basic sequence and an offset. The basic sequence $S_0$ is expressed as Equation (3)

$$S_0=\{\alpha, \alpha^2, \alpha^3, \ldots, \alpha^{Q-2}, \alpha^{Q-1}\} \quad (3)$$

where $\alpha$ is a primitive element of the Galois Field (Q) ($\alpha^m \neq 1$ for m<Q–1, $\alpha^{Q-1}=1$). If Q=7, the primitive element is 3. Thus, $S_0=\{3, 3^2, 3^3, \ldots, 3^5, 3^6\} \bmod 7=\{3, 2, 6, 4, 5, 1\}$. The basic sequence $S_0$ is a sequence assigned to subchannel #0 for a reference BS. Let the reference BS be called BS #0. BS #0 becomes the first of all BSs in the OFDMA communication system. Subchannel #0 is the first of 97 subchannels.

A sequence $S_m$ assigned to an $m^{th}$ cell is obtained by permuting the basic sequence $S_0$ m times. That is, as expressed in Equation (4)

$$S_m = \alpha^m S_0 = \{\alpha^{Q-m}, \alpha^{Q-m+1}, \ldots, \alpha^{Q-2}, \alpha^{Q-1}, \alpha, \alpha^2, \ldots, \alpha^{Q-m-1}\} \quad (4)$$

where $S_m$ is a sequence assigned to the subchannel #0 for an $m^{th}$ BS.

A sequence of $S_{m,\beta}$ defining the subchannels for the $m^{th}$ BS is the sum of the sequence $S_m$ assigned subchannel #0 and an offset $\beta$, as defined in Equation (5).

$$S_{m,\beta}=S_m+\{\beta, \beta, \beta, \ldots, \beta, \beta\}; \; \beta \in GF(Q) \quad (5)$$

where GF(Q) is the Galois Field(Q).

In the above manner, the subchannels can be assigned to each of the Q–1 BSs in the OFDMA communication system. Q subchannel sequences are created for each of the Q–1 BSs. The subchannel sequences have a collision probability of, at most, one subchannel between neighboring BSs, thereby preventing the degradation of system performance caused by the subchannel collision.

Table 1 and Table 2 list sequences for the subchannel #0 in the BSs and the subchannel sequences for the BS #0, respectively under the conditions that Galois Field(Q)=7, $\alpha$=3, and $S_0=\{3, 2, 6, 4, 5, 1\}$.

TABLE 1

| $S_0$ | 3 | 2 | 6 | 4 | 5 | 1 |
|---|---|---|---|---|---|---|
| $S_1$ | 1 | 3 | 2 | 6 | 4 | 5 |
| $S_2$ | 5 | 1 | 3 | 2 | 6 | 4 |
| $S_3$ | 4 | 5 | 1 | 3 | 2 | 6 |
| $S_4$ | 6 | 4 | 5 | 1 | 3 | 2 |
| $S_5$ | 2 | 6 | 4 | 5 | 1 | 3 |

TABLE 2

| $S_{0,0}$ | 3 | 2 | 6 | 4 | 5 | 1 |
|---|---|---|---|---|---|---|
| $S_{0,1}$ | 4 | 3 | 0 | 5 | 6 | 2 |
| $S_{0,2}$ | 5 | 4 | 1 | 6 | 0 | 3 |
| $S_{0,3}$ | 6 | 5 | 2 | 0 | 1 | 4 |
| $S_{0,4}$ | 0 | 6 | 3 | 1 | 2 | 5 |
| $S_{0,5}$ | 1 | 0 | 4 | 2 | 3 | 6 |
| $S_{0,6}$ | 2 | 1 | 5 | 3 | 4 | 0 |

Table 1 lists sequences for the subchannel #0 for the different cells, and Table 2 lists the subchannel sequences assigned to the BS #0. As noted from Table 1 and Table 2, because there is a collision probability of one subchannel at most, the degradation of the system performance caused by the subchannel collision is prevented.

In a cellular communication system with a frequency reuse factor of 1, the number of the identifiable BSs must be increased to facilitate network design, that is, BS installation. For this purpose, Q of the Galois Field(Q) needs to be increased. In accordance with the present invention, a two-dimensional subchannel assignment method is used in the time domain as well as the frequency domain in order to increase the number of identifiable BSs. For example, if one OFDM symbol is delivered on 1552 (=97×16) subcarriers and 6 OFDM symbols are used as one subcarrier assignment unit, 97×16×6 (=97×96) data subcarriers are used. When the subchannel sequences are defined in the Galois Field(97), 97 subchannels can be assigned to each of the 96 cells.

The basic sequence $S_0$ using a primitive element 5 of the Galois Field(97) is achieved by calculating Equation (3) using Q=97 and $\alpha$=5. $S_0$ is given by Equation (6)

$$S_0 = \{5, 25, 28, 43, 21, 8, 40, 6, 30, 53, 71, 64, 29, 48, 46, 46, 83, \quad (6)$$
$$27, 38, 93, 77, 94, 82, 22, 13, 65, 34, 73, 74, 79, 7, 35, 78,$$
$$2, 10, 50, 56, 86, 42, 16, 80, 12, 60, 9, 45, 31, 58, 96, 92,$$
$$72, 69, 54, 76, 89, 57, 91, 67, 44, 26, 33, 68, 49, 51, 61,$$
$$14, 70, 59, 4, 20, 3, 15, 75, 84, 32, 63, 24, 23, 18, 90, 62,$$
$$19, 95, 87, 47, 41, 11, 55, 81, 17, 85, 37, 88, 52, 66, 39, 1\}$$

With reference to FIG. 4, the two-dimensional subchannel assignment in the frequency and time domains will be described.

FIG. 4 illustrates a two-dimensional subchannel assignment in the frequency and the time domains according to the embodiment of the present invention.

Before describing FIG. 4, it is assumed that 96 BSs are identifiable and the subcarriers are assigned such that 97 subchannels can be identified for each of the 96 BSs. As illustrated in FIG. 4, 97×96 subcarriers are grouped into 96 groups for six OFDM symbol periods in the time-frequency domain and 97 successive subcarriers are given to each of the 96 groups. In FIG. 4, the subcarrier index denotes the index of each subcarrier, and the symbol index denotes the index of each OFDM symbol in the time domain.

Referring to FIG. 4, since Q=97, a sequence defining the subchannels for an $m^{th}$ BS, $\{S_{m,\beta}\}$ ($0 \leq m \leq 95, 0 \leq \beta \leq 96$) can be created by Equation (4) and Equation (5) using the basic sequence $S_0$ of Equation (6). Thus, 97 subchannels can be assigned to each of the 96 BSs.

Meanwhile, in the case where the OFDMA communication system uses Q(Q−1) subcarriers, the subcarriers are divided into L groups, with Q×L subcarriers for one OFDM symbol. If N (=(Q−1)/L) OFDM symbols are used, the indexes of subcarriers forming each subchannel are expressed as in Equation (7)

$$\text{sub\_carrier index}(n{:}i) = Q \times (i - L \times \lfloor i/L \rfloor) + S_{m,\beta}(i); n = \lfloor i/L \rfloor \quad (7)$$

where $\lfloor x \rfloor$ denotes the largest integer less than or equal to x. In FIG. 4, because Q=97, L=16, and N=6, the group index i is one of 0 to Q−2, that is, one of 0 to 95 and the symbol index n is one of 0 to 5.

For α=5, the indexes of the subcarriers for the subchannel #0 in the BS #0 are given as follows.

Subcarrier Indexes for Subchannel #0 in BS #0

Symbol 0: 5, 122, 222, 334, 409, 493, 622, 685, 806, 926, 1041, 1131, 1193, 1309, 1404, 1491

Symbol 1: 83, 124, 232, 384, 465, 579, 664, 701, 789, 938, 1004, 1140, 1238, 1340, 1365, 1490

Symbol 2: 78, 99, 204, 341, 444, 571, 624, 695, 856, 885, 1030, 1076, 1209, 1292, 1416, 1551

Symbol 3: 92, 169, 263, 345, 464, 574, 639, 770, 843, 917, 996, 1100, 1232, 1310, 1409, 1516

Symbol 4: 14, 167, 253, 295, 408, 488, 597, 754, 860, 905, 1033, 1091, 1187, 1279, 1448, 1517

Symbol 5: 19, 192, 281, 338, 429, 496, 637, 760, 793, 958, 1007, 1155, 1216, 1327, 1397, 1456

With this subcarrier assignment, there is a collision probability of, at most, one subchannel between different cells. The collision probability is much less than those of the conventional communication systems. For example, in the IEEE 802.16a communication system, 32 subchannels can be assigned to each cell, with a collision probability of 0 to 5 subcarriers between subchannels of different cells. On the other hand, the collision probability is reduced to 0 or 1 in the present invention.

In the case of the RS sequence, Q−1 subcarriers form one subchannel and a maximum number of collision occurrences between subcarriers of the subchannels from different cells is 1. Thus, a subcarrier collision rate is at most 1/(Q−1), which decreases with Q. Therefore, the two-dimensional subcarrier assignment in the time-frequency domain according to the present invention advantageously increases the number of the identifiable cells and reduces the subcarrier collision rate.

(2) Band Assignment Based On the Two-Dimensional Subchannel Assignment in the Time-Frequency Domain As described before in the Description of the Related Art, a signal transmitted from a transmitter, that is a BS, travels to a receiver, that is an MSS, along multiple paths in the OFDMA mobile communication system. Therefore, a signal received at the MSS is subject to frequency-selective fading. Although the BS transmits the subcarrier signals having the same frequency response, the MSS receives the subcarrier signals having different frequency responses due to the frequency-selective fading phenomenon. Thus, to compensate for the performance degradation caused by the frequency-selective fading, the frequency-selective AMC scheme was proposed. The frequency-selective AMC scheme adaptively controls a modulation and coding scheme for each subcarrier according to the frequency response characteristic of the subcarrier.

A modulation scheme is a method of controlling the transmit power, and a coding scheme is a method of adjusting a coding rate. Instead of changing both the modulation and coding schemes, only the coding scheme can be changed. This is a rate adaptive AMC scheme. Only the modulation scheme can be adaptively controlled by what is referred to as a margin adaptive AMC scheme. The frequency response can be defined as the CINR. In this case, the modulation and coding schemes are adaptively adjusted according to the CINR of each subcarrier.

Also, as described earlier, to make the frequency-selective AMC scheme viable, the MSSs must feed back the CQIs of all of the received subcarriers. The channel states of the subcarriers assigned to an MSS continuously change. Hence, the MSS must feed back the CQIs of the subcarriers to the BS so that the BS can successfully use the AMC scheme. However, the frequency feedback of the CQIs of all of the subcarriers brings about a signaling overhead and the CQI feedback signaling serves as uplink interference.

In accordance with the present invention, therefore, in order to minimize the CQI feedback-caused signaling load and the implementation complexity of the frequency-selective AMC scheme, the subcarriers available to the OFDMA mobile communication system are grouped, the subchannels are constructed using the subcarriers of the subcarrier groups, the subchannels having good frequency response characteristics, that is good channel quality, are selected from among the subchannels, and the frequency-selective AMC scheme is applied to the selected subchannels.

Subcarriers are set as adjacent to each other as possible and must be assigned to an MSS to use the frequency-selective AMC scheme. It is assumed herein that L subcarrier groups exist for one OFDM symbol and the subcarriers are selected to form the subchannels for N OFDM symbol periods according to Equation (7). It is also assumed that the entire frequency band of the OFDMA mobile communication system is divided into B subbands and one AMC subchannel is formed using the subcarriers from each of the B subbands. Here, B is a divisor of L.

As described above, in the case where one subchannel is divided into B subbands and one AMC subchannel is constructed using the subcarriers from each of the B subbands, B AMC subchannels are created, each having (Q−1)/B subcarriers in the OFDMA mobile communication system. To create the AMC subchannels each having as many of the subcarriers as those of a conventional subchannel, that is (Q−1) subcarriers, the subcarriers forming the B subchannels are grouped by subband and then the B AMC subchannels, each having (Q−1) subcarriers, are created. For notational simplicity, the subchannels that are formed based on the two-dimensional subchannel assignment in the time-frequency domain are called "diversity subchannels".

Figure 5:
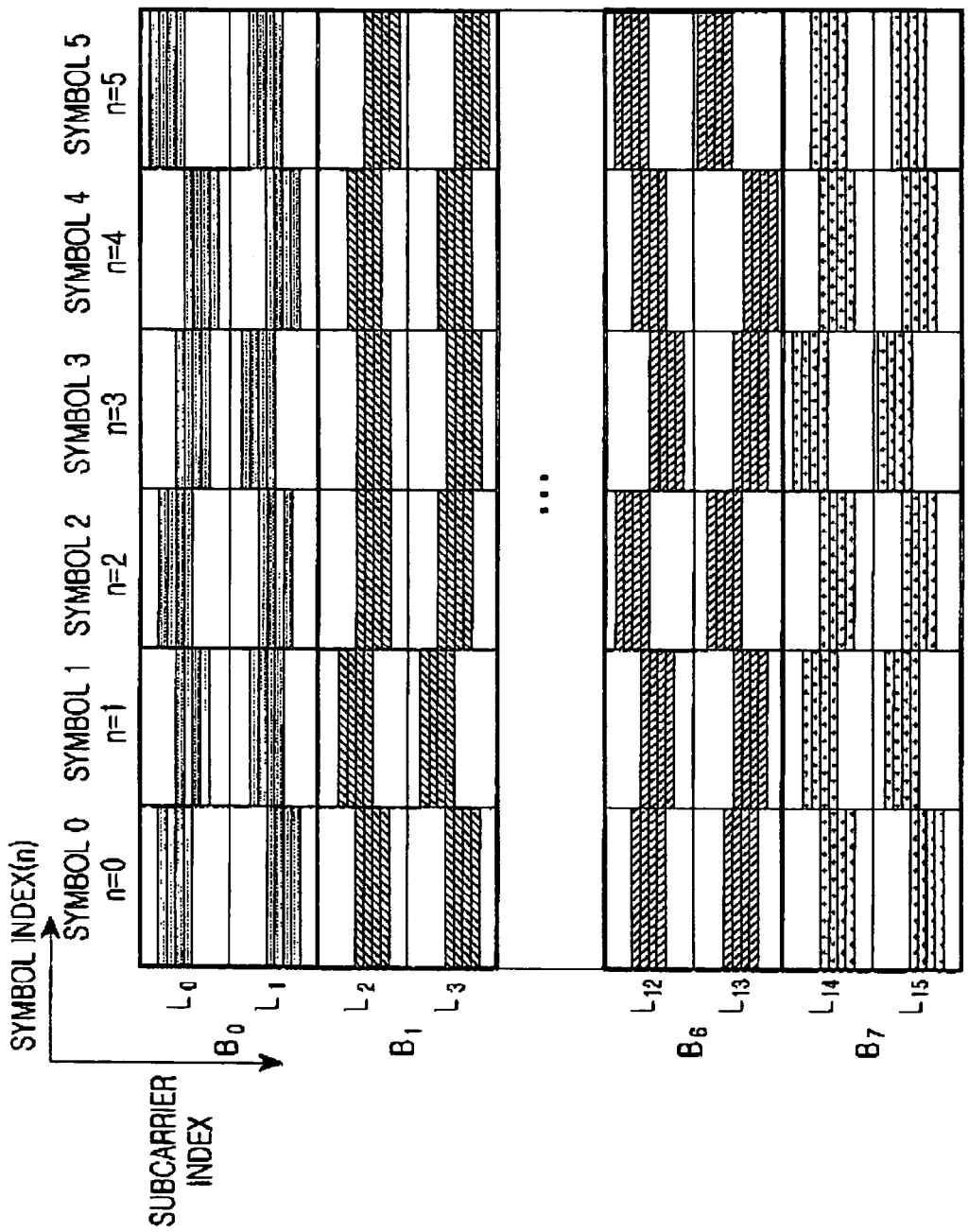
FIG. 5 illustrates an assignment of AMC channels based on the two-dimensional subchannel assignment in the frequency and the time domains according to the embodiment of the present invention.

With reference to FIG. 5, a description will be made of the AMC subchannel assignment based on the two-dimensional subchannel assignment in the time-frequency domain.

Before describing FIG. 5, it is assumed that 96 BSs are identifiable and the subcarriers are assigned such that 97 subchannels can be identified for each of the 96 BSs. As illustrated in FIG. 4, the 97×96 subcarriers are grouped into 96 groups for six OFDM symbol periods in the time-frequency domain and 97 successive subcarriers are given to each of the 96 groups. The AMC subchannels assignment is based on the two-dimensional diversity subchannel assignment in the time-frequency domain. In FIG. 5, the total frequency domain is divided into B subbands. In the illustrated case, the size Q of the Galois Field is 97, the number L of the subcarrier groups defined per OFDM symbol to form a subchannel is 16, and the number N of OFDM symbols per subchannel is 6 (Q=97, L=16, N=6, and B=8).

The symbol index denotes the index of time-domain OFDM symbol, the subband index denotes the index of a subband, and $L_i$ is the index of a subcarrier group. Since N=6, 6 OFDM symbol indexes 0 to 5 (n=0 to n=5) are available. The subband indexes are from $B_0$ to $B_7$ because B=8. Hence, the B AMC subchannels can be constructed using the subcarriers forming the B diversity subchannels. Because the collision characteristics between the B AMC subchannels are identical to those between the B diversity subchannels, one block including B×(Q−1) subcarriers corresponding to the B AMC subchannels may collide with that of a neighbor cell at a maximum of $B^2$ subcarrier positions.

The AMC subchannel construction can be summarized by the following equations.

It is first assumed that the AMC subchannels $b_0$ to $b_0$+B−1 are formed using the subcarriers that form the diversity subchannels $\beta_0$ to $\beta_0$+B−1 of an $m^{th}$ BS. In this case, the subcarriers of the a $(b_0+b)^{th}$ AMC subchannel in a $b^{th}$ subband are expressed as in Equation (8)

$$\text{Sub\_carrier index}(n,b:i) = Q \times L \times [(L/B)b+(\lfloor i/B \rfloor \% (L/B))] + S_{m,\beta_0+(i \% B)}(\lfloor i/B \rfloor); n = \lfloor i/L \rfloor \quad (8)$$

where n is a symbol index and i is a subcarrier index. From Equation (8), it is noted that the diversity subchannels being defined, if these are B subbands, the first diversity subchannel index $\beta_0$ used to define the AMC subchannels, the number of the AMC subchannels being a multiple of B are determined, the total Q diversity subchannels can be used separately as diversity subchannels and AMC subchannels.

In the embodiment of the present invention, once information related to the separation of the diversity subchannels and the AMC subchannels is known, the subcarriers forming the subchannels can be set using the subchannel indexes only. Therefore, the information bits of a control signal used for the AMC subchannel assignment are decreased in number. For example, if B=8, 0 to 80 subchannels are used for the diversity subchannels, and 81 to 96 subchannels are used for the AMC subchannels, a BS notifies an MSS of the respective numbers of the subchannels used for the diversity subchannels and the AMC subchannels on a system information (SI) channel. The BS tells the MSS of the index of a subchannel assigned to the MSS, between 0 to 96. Then, the MSS can detect the indexes of the subcarriers for the subchannel according to the subchannel assignment method described in Equation (7) and Equation (8).

Under the above assumption that Q=97, L=16, N=6, and B=8, the indexes of the subcarriers forming an AMC subchannel are described in Equation (9)

$$\text{Sub\_carrier index}(n,b:i) = 97 \times 16 \times [2b+(\lfloor i/8 \rfloor \% 2)] + S_{m,\beta_0+(i \% 8)}(\lfloor i/8 \rfloor); n = \lfloor i/16 \rfloor \quad (9)$$

The AMC subchannel assignment operation according to the embodiment of the present invention will be described with reference to FIG. 6.

Figure 6:
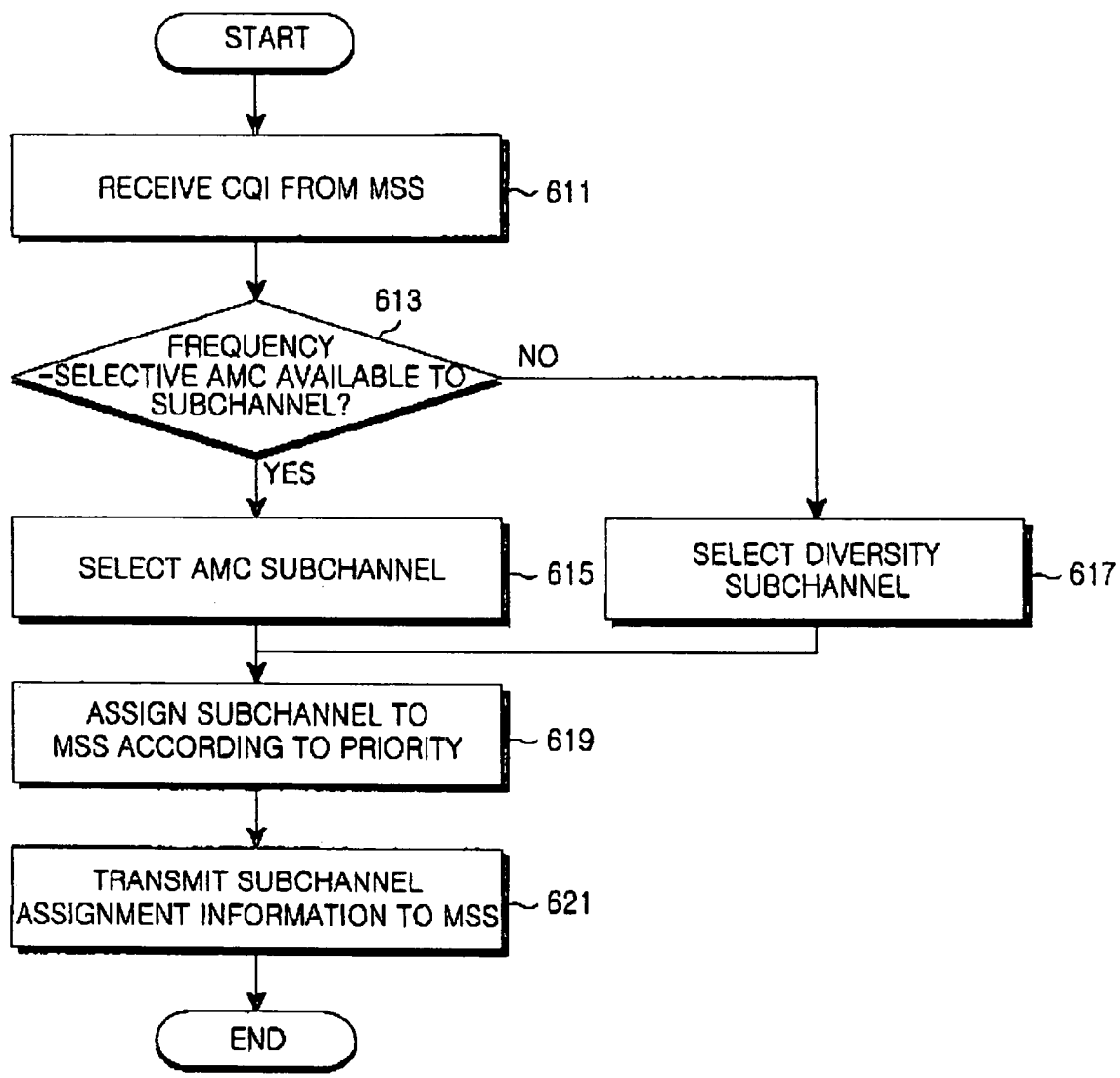
FIG. 6 is a flowchart illustrating an AMC channel assignment operation according to the embodiment of the present invention.

FIG. 6 is a flowchart illustrating the AMC subchannel assignment operation according to the embodiment of the present invention. Referring to FIG. 6, the BS receives the CQI of each subband from an MSS in step 611. This operation occurs for all of the MSSs within the coverage area of the BS, but only one MSS is considered for conciseness. The feedback of the CQI of each subband from the MSS will be described.

The total frequency band available to the OFDMA mobile communication system is divided into B subbands, each having a plurality of subcarriers. The subcarriers in each subband deliver data or pilots. Obviously, the number of subcarriers in the total frequency band varies depending on the system configuration. It is assumed here that the total frequency band comprises 97×16×6 subcarriers, it is divided into 8 subbands, and a frequency area occupying 96 subcarriers forms one subchannel.

While not shown, the subcarriers at predetermined positions in the subband deliver a pilot signal. These subcarriers are called pilot subcarriers. The subcarriers for transmitting data are called data subcarriers. As described earlier, in view of the nature of the mobile communication system unlike a fixed wireless communication system, channel state is varying and, for efficient communications considering the channel state changes, a CQI representing the channel state is frequently reported. CINR can be used as the CQI, as in the embodiment of the present invention.

The pilot subcarriers at the predetermined positions in each subband transmit a pilot signal. Although 8 subbands exist, only a first subband $B_0$ is used to describe the CQI feedback. The CQI feedback is carried out in the same manner in the other subbands. The MSS has knowledge of the positions of the pilot subcarriers transmitted by the BS and the pilot signal on the pilot subcarriers. The pilot signal is a preset sequence between the BS and the MSS. The MSS detects the CINR of the pilot subcarriers in each subband by dividing a signal received on the pilot subcarriers by the pilot signal on the pilot subcarriers. In this manner, the CINRs of all the pilot subcarriers are detected and interpolated, to thereby estimate the CINRs of the remaining subcarriers, that is, the data subcarriers. The MSS feeds back the thus-achieved CINRs (i.e. CQIs) of the 8 subbands to the BS. The BS then determines a subchannel to be assigned to the MSS based on the CQIs.

While the CQI feedback has been described above in the case where pilots are separated from data in the frequency domain, the same is applied to the case where each BS uses a different reference signal, that is, a different pilot symbol in the time domain. For example, as in a CDMA communication system, each BS multiplies each subcarrier by an orthogonal code and a PN code and transmits a pilot signal on the subcarriers, and an MSS demodulates a pilot signal with a PN code and an orthogonal code specific to its serving BS, thereby obtaining the channel response and CINR of each subcarrier.

In the embodiment of the present invention, the MSS feeds back the CQIs of all of the 8 subbands to the BS, but the CQI feedback can be carried out in a different manner. For example, the MSS detects the CINR of each subband in the above-described manner and feeds back to the BS the average CINR of the total frequency band, the average CINR of b subbands having the best the CINRs, CINR differences between the subbands, and the indexes of the subbands. To minimize the signaling overhead, instead of directly transmitting the CINR, an MCS level corresponding to the CINR can be transmitted.

In step 613, the BS analyzes the received CQIs and determines if the frequency-selective AMC scheme is available to the MSS considering the frequency-selective fading of a channel the MSS undergoes, the mobile velocity of the MSS, and the average CINR of the MSS. If the frequency-selective AMC scheme is available, the BS selects the AMC subchannel assignment for the MSS in step 615. On the other hand, if the frequency-selective AMC scheme is not available, the BS selects the diversity subchannel assignment in step 617.

In step 619, the BS assigns an AMC subchannel or a diversity subchannel to the MSS according to its priority level and goes to step 621. In the former case, the BS selects an AMC subchannel from a subband having the best CINR for the MSS. In the latter case, the BS selects a diversity subchannel for the MSS.

In step 621, the BS transmits information about the assigned subchannel to the MSS. The subchannel assignment information is transmitted on an existing control channel between the BS and the MSS or on a newly defined control channel.

In accordance with the present invention as described above, the frequency-selective AMC scheme is based on the two-dimensional subchannel assignment in the time-frequency domain in an OFDMA mobile communication system. Therefore, the transmission capacity is maximized. Also, the adaptive assignment of a diversity subchannel or an ACM subchannel according to the channel state of an MSS enables the service provisioning in compliance with the characteristics of the MSS. Furthermore, the inventive subchannel assignment minimizes a collision probability between the subchannels from neighboring BSs, thereby preventing system performance degradation which might otherwise result from subchannel collision.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A subchannel assigning method in an orthogonal frequency division multiplexing (OFDM) communication system having a total frequency band divided into a plurality of subcarriers, comprising the steps of:

generating (Q−1) groups for n symbol periods by grouping the plurality of subcarriers for each of the n symbol periods into (Q−1)/n groups;

generating L groups by grouping the (Q−1) groups;

generating B subbands by grouping the L groups;

detecting P subcarriers from each of (Q−1)/L groups among L/B groups included in a specific subband among the B subbands; and assigning the P subcarriers as an adaptive modulation and coding (AMC) subchannel to which an AMC scheme is applied, wherein each of the B subbands includes L/B groups and Q is a number of successive subcarriers included in each of the (Q−1) groups.

2. The method of claim 1, further comprising the steps of:

detecting Z subcarriers from each of the (Q−1) groups; and assigning the Z subcarriers as a diversity subchannel, wherein the Z subcarriers are different from the P subcarriers.

3. The method of claim 1, wherein detecting P subcarriers comprises the step of:

detecting the P subcarriers from each of the (Q−1)/L groups among the L/B groups included in the specific subband among the B subbands according to a first sequence, wherein the first sequence indicates indexes of the P subcarriers, and wherein the first sequence is determined by $$\text{Sub\_carrier index } (n,b:i) = Q \times L \times [(L/B)b + (\lfloor i/B \rfloor \% (L/B))] + S_{m,\beta_0 + (i \% B)}(\lfloor i/B \rfloor); n = \lfloor i/L \rfloor$$

where Sub_carrier index (n,b:i) denotes a subcarrier index, b denotes an index of the specific subband, i denotes a group index, Q denotes a size of a Galois Field and $S_{m,\beta_0}$ denotes a sequence that defines a first diversity channel (diversity channel #0) for an $m^{th}$ base station (BS) from among a plurality of BSs in the OFDM communication system.

4. The method of claim 2, wherein detecting Z subcarriers comprises the step of:

detecting the Z subcarriers from each of the (Q−1) groups according to a second sequence, wherein the second sequence indicates indexes of the Z subcarriers, and wherein the second sequence is determined by $$\text{sub\_carrier index } (n:i) = Q \times (i - L \times \lfloor i/L \rfloor) + S_{m,\beta}(i); n = \lfloor i/L \rfloor$$

where Sub_carrier index (n,b:i) denotes a subcarrier index, i denotes a group index and $S_{m,\beta}$ denotes a sequence that defines each of subchannels for an $m^{th}$ base station (BS) from among a plurality of BSs existing in the OFDM communication system.

5. A subchannel assigning apparatus in an orthogonal frequency division multiplexing (OFDM) communication system where a total frequency band is divided into a plurality of subcarriers, comprising:

a subchannel/subband allocator for generating (Q−1) groups for n symbol periods by grouping the plurality of subcarriers for each of the n symbol periods into (Q−1)/n groups, generating L groups by grouping the (Q−1) groups, generating B subbands grouping the L groups, detecting P subcarriers from each of (Q−1)/L groups among L/B groups included in a specific subband among the B subbands, and assigning the P subcarriers as an adaptive modulation and coding (AMC) subchannel to which an AMC scheme is applied; and a transmitter for, upon generation of data to be transmitted, transmitting the data on the assigned AMC subchannel, wherein each of the B subbands includes L/B groups and Q is a number of successive subcarriers included in each of the (Q−1) groups.

6. The apparatus of claim 5, wherein the subchannel/subband allocator detects Z subcarriers from each of the groups and assigns the Z subcarriers as a diversity subchannel, wherein the Z subcarriers are different from the P subcarriers.

7. The apparatus of claim 5, wherein the subchannel/subband allocator detects P subcarriers from each of the (Q−1)/L groups among the L/B groups included in the specific subband among the B subbands according to a first sequence;

wherein the first sequence indicates indexes of the P subcarriers, and wherein the first sequence is determined by $$\text{Sub\_carrier index } (n,b:i) = Q \times L \times [(L/B)b + (\lfloor i/B \rfloor \% (L/B))] + S_{m,\beta_0 + (i \% B)}(\lfloor i/B \rfloor); n = \lfloor i/L \rfloor$$

where Sub_carrier index (n,b:i) denotes a subcarrier index, b denotes an index of the specific subband, i denotes a group index, Q denotes a size of a Galois Field and $S_{m,\beta_0}$ denotes a sequence that defines a first diversity channel (diversity channel #0) for an $m^{th}$ base station (BS) from among a plurality of BSs existing in the OFDM communication system.

8. The apparatus of claim 6, wherein the subchannel/subband allocator detects the Z subcarriers from each of the (Q−1) groups according to a second sequence,
wherein the second sequence indicates indexes of the Z subcarriers, and
wherein the second sequence is determined by $$\text{sub\_carrier index } (n{:}i) = Q \times (i - L \times \lfloor i/L \rfloor) + S_{m,\beta}(i); \; n = \lfloor i/L \rfloor$$

where Sub_carrier index (n,b:i) denotes a subcarrier index, i denotes a group index and $S_{m,\beta}$ denotes a sequence that defines each of subchannels for an $m^{th}$ base station (BS) from among a plurality of BSs existing in the OFDM communication system.

* * * * *